United States Patent [19]

Lockhart et al.

[11] Patent Number: 4,517,337

[45] Date of Patent: May 14, 1985

[54] ROOM TEMPERATURE VULCANIZABLE ORGANOPOLYSILOXANE COMPOSITIONS AND METHOD FOR MAKING

[75] Inventors: Thomas P. Lockhart, Bethesda, Md.; Jeffrey H. Wengrovius, Scotia, N.Y.

[73] Assignee: General Electric Company, Schenectady, N.Y.

[21] Appl. No.: 583,530

[22] Filed: Feb. 24, 1984

[51] Int. Cl.³ .............................................. C08L 83/02
[52] U.S. Cl. ................................... 524/859; 528/18; 528/33; 528/34; 528/901; 524/860
[58] Field of Search ............... 528/18, 33, 34, 901; 524/859, 860

[56] References Cited

U.S. PATENT DOCUMENTS

| | | |
|---|---|---|
| 2,607,792 | 8/1952 | Warrick . |
| 3,153,007 | 10/1964 | Boot . |
| 3,161,614 | 12/1964 | Brown et al. . |
| 3,661,887 | 5/1972 | Leebrick ................................ 528/18 |
| 3,664,997 | 5/1972 | Chadha et al. ......................... 528/18 |
| 4,100,129 | 7/1978 | Beers ..................................... 528/18 |
| 4,395,526 | 7/1983 | White et al. . |

FOREIGN PATENT DOCUMENTS 835790  5/1960  United Kingdom .

Primary Examiner—Melvyn I. Marquis
Attorney, Agent, or Firm—William A. Teoli; James C. Davis, Jr.; James Magee, Jr.

[57] ABSTRACT

Room temperature vulcanizable organopolysiloxane compositions are provided based on the use of a silanol or alkoxy terminated organopolysiloxane and an effective amount of a diorganotinbis(chelate) catalyst.

21 Claims, No Drawings

ROOM TEMPERATURE VULCANIZABLE ORGANOPOLYSILOXANE COMPOSITIONS AND METHOD FOR MAKING

Reference is made to copending application of J. H. Wengrovius, Ser. No. 520,974, for Room Temperature Vulcanizable Organopolysiloxane compositions, now U.S. Pat. No. 4,489,199 and Ser. No. 520,978, for Method for Making Alkoxy Terminated Polydiorganosiloxane, filed concurrently on Aug. 8, 1983, which are assigned to the same assignee as the present invention and incorporated herein by reference.

BACKGROUND OF THE INVENTION

The present invention relates to room temperature vulcanizable organopolysiloxane compositions having improved shelf stability, resulting from the use of an effective amount of a tin condensation catalyst having organo radicals attached to tin by carbon-tin linkages and whose remaining valences are satisfied by a β-diketonate group, for example, di(n-butyl)tinbis(acetylacetonate).

Prior to the present invention as shown by Brown et al, U.S. Pat. No. 3,161,614, attempts were made to make stable room temperature vulcanizable (RTV) compositions employing a polyalkoxy end blocked polysiloxane and a monocarboxylic acid metal salt catalyst, such as dibutyltindilaurate. These compositions did not cure satisfactorily. Improved results were obtained by Beers, U.S. Pat. No. 4,100,129, assigned to the same assignee as the present invention, utilizing as a condensation catalyst, a silanol reactive organometallic ester having organo radicals attached to metal through metal-oxygen-carbon linkages. Experience has shown that in instances where silanol reactive organo tin compounds are used as RTV condensation catalysts which have organo radicals attached to tin by tin-oxygen-carbon linkages the resulting moisture curable compositions are often unstable.

As utilized hereinafter, the term "stable" as applied to the one package polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

Further advances were achieved with the employment of silane scavengers for eliminating chemically combined hydroxy radicals, water, or methanol, as shown by White et al, U.S. Pat. No. 4,395,526, assigned to the same assignee as the present invention and incorporated herein by reference. However, the preparation of these silane scavengers, such as methyldimethoxy-(N-methylacetamide)silane often require special techniques and undesirable by-products can be generated during cure. Further improvements are shown by Dziark for scavengers for one component alkoxy functional RTV compositions and process, Ser. No. 349,695, filed Feb. 17, 1982, now U.S. Pat. No. 4,417,042, assigned to the same assignee as the present invention and incorporated herein by reference.

Organic scavengers for trace amounts of water, methanol and silanol are shown by White et al, Ser. No. 481,524, for One Package, Stable, Moisture Curable Alkoxy-Terminated Organopolysiloxane Compositions, filed Apr. 1, 1983, now U.S. Pat. No. 4,472,551, assigned to the same assignee as the present invention and incorporated herein by reference. Additional scavenging techniques for chemically combined hydroxy functional radicals are shown by Lockhart in copending applications Ser. No. 481,529, now U.S. Pat. No. 4,499,230, Ser. No. 481,527, now U.S. Pat. No. 4,499,229, Ser. No. 481,528 now U.S. Pat. No. 4,477,625 and Ser. No. 481,530, filed concurrently on Apr. 1, 1983 now U.S. Pat. No. 4,467,063.

Although the above discussed techniques for improving the stability of room temperature vulcanizable organopolysiloxane compositions employing a tin condensation catalyst have been found to provide stable, substantially acid-free, curable organopolysiloxanes, a separate organic, inorganic, or organosilicon scavenger for hydroxy functional radicals is required. It would be desirable to make stable room temperature vulcanizable organopolysiloxane compositions utilizing a silanol terminated, or alkoxy terminated polydiorganosiloxane and a tin condensation catalyst which can be used in further combination with an alkoxy silane cross-linking agent and optionally an amine accelerator without the employment of additional materials such as scavengers for hydroxy functional materials.

The present invention is based on our discovery that stable, substantially acid-free, room temperature vulcanizable organopolysiloxane compositions can be made free of scavenger for methanol or hydroxy containing material utilizing as a condensation catalyst a tin compound having two monovalent organo radicals attached to tin by carbon-tin linkages and whose remaining valences are satisfied by β-diketonate group. The tin condensation catalyst used in the practice of the present invention are included within the formula,

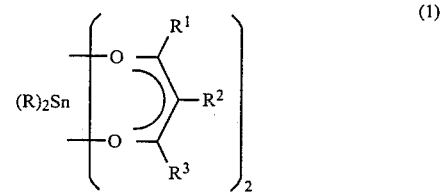

(1)

where R is selected from $C_{(1-18)}$ monovalent hydrocarbon radicals and substituted monovalent hydrocarbon radicals, and $R^1$, $R^2$ and $R^3$ are the same or different monovalent radicals selected from the class consisting of hydrogen, R, $-Si(R)_3$, aryl, acyl and nitrile.

Some of the silanol terminated polydiorganosiloxanes which can be used to make the stable, substantially acid-free, moisture curable organopolysiloxane compositions of the present invention have the formula,

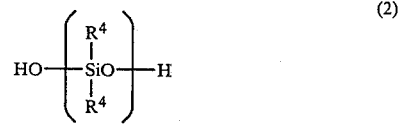

(2)

where $R^4$ is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, hydrogen and mixtures thereof, and n is an integer having a value of from about 5 to about 5000.

Polyalkoxy terminated organopolysiloxane which can be used to make the RTV compositions of the present invention has the formula,

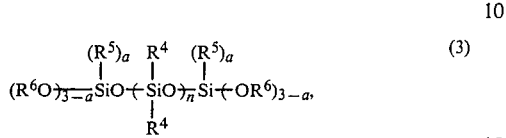   (3)

where $R^4$ and n are as previously defined, $R^5$ is a monovalent radical selected from $C_{(1-13)}$ hydrocarbon radicals and substituted $C_{(1-13)}$ hydrocarbon radicals, $R^6$ is a $C_{(1-8)}$ aliphatic organic radical selected from alkyl radicals, alkylether radicals, alkylester radicals, alkylketone radicals and alkylcyano or a $C_{(7-13)}$ aralkyl radical and a is a whole number equal to 0 or 1.

The RTV compositions of the present invention can contain a cross-linking polyalkoxysilane having the formula,

   (4)

where $R^5$, $R^6$ and a are as previously defined.

The RTV compositions of the present invention also can contain a $\beta$-diketone capable of chelating with the tin condensation catalyst of formula (1), referred to hereinafter as "the chelating ligand". The chelating ligand has been found to impart improved stability to the RTV when utilized in effective amounts and is included by the formula

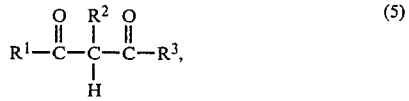   (5)

where $R^1$, $R^2$ and $R^3$ are as previously defined.

STATEMENT OF THE INVENTION

There is provided by the present invention, room temperature vulcanizable compositions comprising by weight,
(A) 100 parts of organopolysiloxane consisting essentially of chemically combined diorganosiloxy units and terminated with polyalkoxy siloxy units,
(B) 0 to 10 parts of a polyalkoxy silane of formula (4),
(C) 0 to 5 parts of amine accelerator,
(D) an effective amount of a tin condensation catalyst of formula (1) and
(E) 0 to 5 parts of chelating ligand of formula (5).

Also included within the scope of the present invention is a method for making room temperature vulcanizable organopolysiloxane compositions which comprises mixing together under substantially anhydrous conditions, the following ingredients by weight,
(i) 100 parts of alkoxy terminated organopolysiloxane of formula (3),
(ii) 0 to 10 parts of polyalkoxy silane of formula (4),
(iii) 0 to 5 parts of amine accelerator,
(iv) an effective amount of tin condensation catalyst of formula (1), and
(v) 0 to 5 parts of chelating ligand of formula (5).

In a further aspect of the present invention, there is provided a method for making a room temperature vulcanizable organopolysiloxane composition which comprises,
(1) agitating under substantially anhydrous conditions
 (i) 100 parts of silanol terminated polydiorganosiloxane of formula (2),
 (ii) 0.1 to 10 parts of alkoxy silane of formula (4), and
 (iii) 0 to 5 parts of amine accelerator,
 (iv) 0 to 700 parts of filler,
 (v) 0 to 5 parts, per 100 parts of the alkoxy terminated polydiorganosiloxane, of a $\beta$-diketone of formula (5)
(2) allowing the mixture of (1) to equilibrate to produce polyalkoxy terminated polydiorganosiloxane, and
(3) further agitating the mixture of (2) under substantially anhydrous conditions with an effective amount of a tin condensation catalyst of formula (1) and 0 to 5 parts of a chelating ligand of formula (5).

Radicals included within R of formula (1) are, for example, $C_{(6-13)}$ aryl radicals and halogenated aryl radicals, such as phenyl, tolyl, chlorophenyl, naphthyl; $C_{(1-18)}$ aliphatic, cycloaliphatic radicals, and halogenated derivatives thereof, for example, cyclohexyl, cyclobutyl; alkyl and alkenyl radicals, such as methyl, ethyl, propyl, chloropropyl, butyl, pentyl, hexyl, heptyl, octyl, vinyl, allyl, and trifluoropropyl; $R^1$, $R^2$ and $R^3$ are the same or different monovalent radicals selected from hydrogen, R, $Si(R)_3$, aryl, acyl and nitrile, $R^4$ and $R^5$ are monovalent radicals selected from R radicals; radicals included within $R^6$ are, for example, $C_{(1-8)}$ alkyl radicals, for example, methyl, ethyl, propyl, butyl, pentyl; $C_{(7-13)}$ aralkyl radicals, for example, benzyl, phenylethyl, alkylether radicals such as 2-methoxyethyl, alkylester radicals, for example, 2-acetoxyethyl, alkylketone radicals, for example 1-butane-3-onyl, alkylcyano radicals, for example 2-cyanoethyl.

Some of the tin condensation catalysts included within formula (1) are, for example,
Di(n-butyl)tinbis(acetylacetonate);
Di(n-butyl)tinbis(benzoylacetonate);
Di(ethyl)tinbis(lauroylacetonate);
Di(methyl)tinbis(pivaloylacetonate);
Di(n-octyl)tinbis(acetylacetonate); and
Di(n-propyl)tinbis(1,1,1-trifluoroacetylacetonate).

Included within the cross-linking polyalkoxysilanes of formula (4) are, for example, methyltrimethoxysilane; methyltriethoxysilane; ethyltrimethoxysilane; tetraethoxysilane; vinyltrimethoxysilane; etc.

Among the amine curing accelerators which can be used in the practice of the present invention are silyl substituted guanidines having the formula,

   (6)

where $R^6$ is as previously defined, Z is a guanidine radical of the formula,

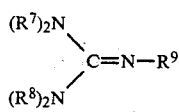

where $R^9$ is divalent $C_{(2-8)}$ alkylene radical, $R^7$ and $R^8$ are selected from hydrogen and $C_{(1-8)}$ alkyl radicals and g is an integer equal to 1 to 3 inclusive. In addition, alkyl substituted guanidines having the formula,

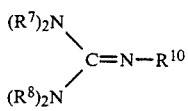

where $R^7$ and $R^8$ are as previously defined and $R^{10}$ is a $C_{(1-8)}$ alkyl radical, also can be employed. Some of the silyl substituted guanidines included within formula (6) are shown by Takago U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine, and silylated amines, for example, γ-aminopropyltrimethoxysilane and methyldimethoxy-d-n-hexylaminosilane. Methyldimethoxy-di-n-hexylaminosilane acts as both a cross-linker and curing accelerator. The primary amines, secondary amines, silylated secondary amines are preferred and secondary amines, and silylated secondary amines are particularly preferred. Silylated secondary amine such as alkyldialkoxy-n-dialkylaminosilanes and guanidines such as alkyldialkoxyalkylguanidylsilanes which are useful as cure accelerators.

In addition to the above-described amine accelerators, there is also included in the practice of the present invention the use of certain sterically hindered diamines which have been found to effect rapid cures of the RTV compositions of the present invention when utilized in effective amounts as previously defined. These nitrogen bases include, for example, di-t-butylethylene diamine (DBEDA), 1,5-diazabicyclo[4.3.0]non-5-ene (DBN) and 1,8-diazabicyclo[5.4.0]undec-7-ene (DBU).

It has been further found that RTV compositions of the present invention utilizing hindered secondary amines shown by the formula, $$HN-(R^{11})_2 \qquad (7)$$

where $R^{11}$ is selected from $C_{(3-18)}$ branched alkyl radicals, have an improved resistance to yellowing over an extended shelf period under sealed conditions. In addition, further RTV improvements are achieved when using formula (7) amines with chelating ligand of formula (5) where the sum of $R^1$ and $R^3$ is greater than eight carbon atoms.

Some of the chelating ligands which are included within formula (5) are, for example,
2,4-pentanedione;
2,2,6,6-tetramethyl-3,5-heptanedione;
1,1,1-trifluoro-2,4-pentanedione;
1-phenyl-1,3-butanedione;
2,4-hexanedione;
5,7-nonanedione;

Silanol-terminted polydiorganosiloxanes of formula (2) are well known and preferably have a viscosity in the range of from about 100 to about 400,000 centipoise and more preferably from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (1) also are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

In order to facilitate the cure of the RTV compositions of the present invention, the tin condensation catalyst of formula (1) can be utilized at from 0.1 to 10 part of tin catalyst per 100 parts of the silanol terminated or alkoxy terminated polydiorganosiloxane and preferably from 0.1 to 1.0 part per 100 parts of the polydiorganosiloxane.

Various fillers, pigments, adhesion promoters, etc., can be incorporated in the silanol or alkoxy-terminated organopolysiloxane, such as for example, titanium dioxide, zirconium silicate, silica aerogel, iron oxide, diactomaceous earth, fumed silica, carbon black, precipitated silica, glass fibers, polyvinyl chloride, ground quartz, calcium carbonate, β-cyanoethyltrimethoxysilane, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example, stirring under moisture-free conditions, a mixture of materials which can consist of the tin condensation catalyst and the alkoxy terminated polydiorganosiloxane. Optionally, cross-linking polyalkoxysilane and amine accelerator can be used.

In instances where silanol terminated polydiorganosiloxane is used in place of the alkoxy terminated polydiorganosiloxane it is preferred that blending of the filler, for example, fume silica, the silanol terminated polydiorganosiloxane and the cross-linking polyalkoxysilane be performed and in the absence of the tin condensation catalyst. The tin condensation catalyst can be introduced advantageously after the resulting blend has been agitated for a period of about 24 hours at room temperature.

As used hereinafter, the expressions "moisture-free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions a mixture of the silanol terminated polydiorganosiloxane or alkoxy terminated polydiorganosiloxane, filler and an effective amount of the tin condensation catalyst. There can be added to the mixture, the cross-linking silane or mixture thereof along with other ingredients, for example, the curing accelerator and pigments.

In order that those skilled in the art will be better able to practice the invention, the following example is given by way of illustration and not by way of limitation. All parts are by weight.

EXAMPLE 1

A room temperature vulcanizable composition was prepared under substantially anhydrous conditions utilizing 100 parts of a methyldimethoxysiloxy chain terminated polydimethylsiloxane having a viscosity of about 3500 centipoises at 25° C. and 0.2 part of di-(n-butyl)tinbis(acetylacetonate). Another room temperature vulcanizable composition was prepared following the same procedure utilizing 0.2 part of dibutyltindiacetate in place of the di-(n-butyl)tinbis(acetylacetonate).

The above room temperature vulcanizable mixtures were then aged for a period of from 0 to 48 hours at 100° C. to determine the stability of the mixtures after the accelerated heat age test. The following results were obtained, where $Bu_2Sn(acac)_2$ is di(n-butyl)tinbis(acetylacetonate) of the present invention and $Bu_2Sn(OAc)_2$ is dibutyltindiacetate of the prior art:

TABLE I

| Catalyst (0.2 parts) | Tack Free Time (TFT, min) after heating at 100° C. | | |
|---|---|---|---|
| | 0 h | 24 h | 48 h |
| $Bu_2Sn(OAc)_2$ | 180 | 120 | n.c.* |
| $Bu_2Sn(acac)_2$ | 20 | 30 | 60 |

*n.c. = No cure; sample had gelled during heating.

The above results show that the RTV compositions of the present invention exhibit superior stability and cure rate as compared to tin catalyzed RTV compositions of the prior art.

EXAMPLE 2

An evaluation was made of di(n-butyl)tinbis(acetylacetonate) as an RTV condensation catalyst. Five formulations were prepared using 100 parts of a methyldimethoxy chain-terminated polydimethylsiloxane having a viscosity of 3500 centipoises, which contained 0.3% by weight of an amine catalyst and 0.1 to 1 part of the di(n-butyl)tinbis(acetylacetonate). The RTV formulations were catalyzed in a dry box and thoroughly mixed using a Semco mixer. Tack-free times (TFT in minutes) were determined at t=0, t=5 days at 25° C. and t=24 hours at 100° C. The following results were obtained:

TABLE II

| Catalyst level (parts) | TFT (min) (t = 0) | TFT (t = 5 days at 25° C.) | TFT (t = 24 h at 100° C.) |
|---|---|---|---|
| 0.1 | 30 | 30 | 40 |
| 0.25 | 12 | 12 | 20 |
| 0.5 | 10 | 10 | 20 |
| 0.75 | 8 | 8 | 20 |
| 1.0 | 7 | 7 | 20 |

The above results show that the cure characteristics of the RTV compositions of the present invention are stable for an extended period of time under ambient conditions. A faster cure rate is also achieved as the concentration of the tin catalyst is increased.

EXAMPLE 3

An RTV formulation was prepared utilizing 100 parts of the above methyldimethoxy chain terminated polydimethylsiloxane of Example 2 and 0.7 part of the di(n-butyl)tinbis(acetylacetonate). The dibutyltin salt was the in situ product of reaction of dibutyltindimethoxide and 2 equivalents of acetylacetonate. Upon exposure to atmospheric moisture under ambient conditions the formulation was found to be tack-free after 5 minutes. The RTV was then heat aged for 24 hours at 100° C. under anhydrous conditions. A tack-free time of 5 minutes was also obtained.

EXAMPLE 4

A series of RTV compositions were prepared under substantially anhydrous conditions to determine the effects of tin catalyst concentration and the use of certain amine accelerators for reducing the cure times of the resulting formulations. Room temperature vulcanizable mixtures were prepared of 100 parts of methyldimethoxysiloxy chain terminated polydimethylsiloxane of Example 1, from 0.2 to 2.0 parts of di(n-butyl)tinbis(acetylacetonate) and from 0.5 to 1.0 parts of amine accelerator. The various RTV's were prepared under substantially anhydrous conditions and allowed to cure under ambient conditions. The following results were obtained, where catalyst (pbw) is di(n-butyl)tinbis(acetylacetonate), "DBU" is 1,8-diazabicyclo[5.4.0]undec-7-ene and "DBEDA" is dibutylethylenediamine:

TABLE III

| pbw Catalyst | Amine., pbw | TFT (min) |
|---|---|---|
| 0.2 | — | 15 |
| 2.0 | — | 2-2.5 |

TABLE III-continued

| pbw Catalyst | Amine., pbw | TFT (min) |
| --- | --- | --- |
| 0.2 | DBU, 0.6 | 5 |
| 2.0 | DBU, 0.5 | 1.5 |
| 1.0 | DBEDA, 1.0 | 2–3 |

The above results show that faster cures can be obtained by increasing concentration of the tin catalyst or using an amine accelerator.

EXAMPLE 5

Additional RTV mixtures were prepared from 100 parts of dimethoxymethylsiloxy terminated polydimethylsiloxane polymer of Example 2, 10 parts of fumed silica, 0.3 part of dibutylamine and effective amounts of tin catalyst. The tin catalyst was dibutyltindiacetate, or di(n-butyl)tinbis(acetylacetonate). In instances where the dibutyltindiacetate was used, there was also employed 2 parts of hexamethyldisilazane. The following results were obtained when the aforementioned filled room temperature vulcanizable compositions were allowed to cure under ambient conditions:

TABLE IV

| Catalyst | pbw of Catalyst | TFT (min) |
| --- | --- | --- |
| $Bu_2Sn(OAc)_2$ | 0.25 | 17 |
| $Bu_2Sn(acac)_2$ | 0.23 | 10 |
| $Bu_2Sn(acac)_2$ | 0.30 | 5 |

The above results show that filled room temperature vulcanizable compositions made in accordance with the practice of the present invention are faster curing than RTV compositions of the prior art.

EXAMPLE 6

A mixture of 100 parts of a silanol terminated polydimethylsiloxane having a viscosity of 124,000 centipoise at 25° C., 2 parts of methyltrimethoxysilane, 0.3 part of dibutylamine and 0.085 part of acetylacetone was thoroughly mixed in a dry box and allowed to react for 4 days at room temperature. There was obtained a methyldimethoxysiloxy terminated polydimethylsiloxane based on method of preparation and NMR spectra.

An RTV composition was made by adding 0.4 part of di(n-butyl)tinbis(acetylacetonate) to the above silicon polymer. Upon exposure of a portion of the resulting RTV, it cured to a tack-free state in 20 minutes. The balance of the RTV was heat aged for 48 hours at 100° C. The resulting RTV was then exposed to atmospheric moisture. It was found that no change in the tack-free time resulted after the 100° C. aging for 48 hours. These results show that the room temperature vulcanizable compositions of the present invention prepared initially from a silanol terminated polydimethylsiloxane were stable.

EXAMPLE 7

A mixture of 100 parts of a dimethoxymethylsiloxy terminated polydimethylsiloxane having a viscosity of 266,000 centipoises at 25° C., 0.3 parts methyltrimethoxysilane, 0.3 parts dibutylamine, 30 parts trimethylsiloxy terminated polydimethylsiloxane, 15 parts of $SiO_2$ filler, 1.4 parts of cyanoethyltrimethoxy silane, 0.3 parts of di(n-butyl)tinbis(benzoylacetonate), and 0.3 part of benzoylacetone was thoroughly blended in a Semco mixer. Upon exposure to atmospheric moisture under ambient conditions, the RTV formulation cured to a tack-free state in 30 minutes. The RTV was then heat aged for 48 hours at 100° C. under anhydrous conditions. The resulting RTV was found to have a tack-free time of 40 minutes.

EXAMPLE 8

An RTV formulation was prepared containing 100 parts of methyldimethoxysiloxy terminated polydimethylsiloxane having a viscosity of 266,000 centipoises at 25° C., 0.25 part di(n-butyl)tinbis(acetylacetonate), 1.4 part of β-cyanoethyltrimethoxysilane, 30 parts of a trimethylsiloxy terminated polydimethylsiloxane having a viscosity of 100 centipoise and 17 parts of fumed silica. There was added 0.075 part of acetylacetone to half of the formulation. The resulting mixture was found to have a TFT of 15 minutes, and after heat aging for 48 hours at 100° C., a TFT of 90 minutes. To the other half of the initial formulation was added 0.20 part of acetylacetone. This RTV had a TFT of 15 minutes both before and after heat aging.

The above procedure was repeated, except that in place of the di(n-butyl)tinbis(acetylacetonate) there was utilized di(n-butyl)tindimethoxide as the condensation catalyst. The resulting RTV was found to have a TFT of 20 minutes and after heat aging at 1½ hours at 100° C., it had a TFT of 45 minutes. The RTV did not cure after 15 hours at 100° C.

The above results show that the tin condensation catalyst of the present invention free of organo radicals attached to tin by tin-oxygen-carbon linkages other than a β-diketonate radical, provides superior stability as compared to tin condensation catalysts containing monovalent organo radicals attached to tin by tin-oxygen-carbon linkages.

EXAMPLE 9

A series of tin condensation catalysts were prepared utilizing three chelating ligands within the scope of formula (5) where $R^2$ was hydrogen in all three instances and $R^1$ and $R^3$ were respectively ethyl and ethyl (chelate ligand 1), phenyl and methyl (chelate ligand 2) and phenyl, propyl (chelate ligand 3).

Three tin condensation catalysts were separately prepared by adding two equivalents respectively of the aforementioned chelating ligands per one equivalent of dibutyltindimethoxide in a drybox at 25° C. In each instance, upon contact between the respective chelating ligand and the dibutyltindimethoxide, immediate reaction was observed yielding the desired tin chelate complex. The respective tin condensation catalysts were then isolated in near quantitative yields after removal of the volatiles in vacuo. Tin condensation catalyst 1 resulting from the reaction of chelating ligand 1, where $R^1$ and $R^3$ of formula (5) were ethyl and $R^2$ was hydrogen and tin condensation catalyst 3 resulting from the reaction of chelating ligand 3, where $R^1$ was phenyl and $R^3$ of formula (5) was n-propyl and $R^2$ was hydrogen, were both yellow liquids and were not purified further. Tin condensation catalyst 2 resulting from the employment of chelating ligand 2, where $R^1$ in formula (5) was phenyl and $R^3$ was methyl and $R^2$ was hydrogen provided a tin condensation catalyst in the form of an off-white crystalline solid which was recrystallized from pentane. The identity of each of the tin condensation catalysts was confirmed by NMR.

A base RTV formulation was prepared by mixing for 15 minutes in a drybox utilizing a Semco mixer, 100 parts of a methyldimethoxysiloxy endcapped silicone polymer having a viscosity of 150,000 centipoises at 25° C., 0.3 part of diisobutylamine, 1.5 parts of methyltrimethoxysilane, 0.07 parts of 2-ethylhexanoic acid, 17 parts of fumed silica, and 1.4 parts of β-cyanoethyltrimethoxysilane.

Four RTV compositions were prepared utilizing 100 parts of the above base formulation, 0.25 part of dibutyltinacetylacetonate and 0.25 part of acetylacetone (Control), 100 parts of the base formulation, 0.3 part of tin condensation catalyst 1, and 0.2 part of chelating ligand 1, where $R^1$ and $R^3$ are ethyl and $R^2$ is hydrogen (RTV 1), 100 parts of the base formulation, 0.3 part of tin condensation catalyst 2 and 0.3 part of chelating ligand, where $R^1$ and $R^3$ of formula (5) are phenyl and methyl respectively, and $R^2$ is hydrogen (RTV 2); and 100 parts of the base formulation, 0.36 part of tin condensation catalyst 3 and 0.46 part of chelating ligand 3, where $R^1$ is phenyl, $R^3$ is n-propyl and $R^2$ of formula (5) is hydrogen (RTV 3).

Tack-free times for each of the four RTV formulations were determined upon initial mixing and after heating the uncured RTV for 48 hours at 100° C. The following results were obtained.

TABLE V

| RTV | TFT (min) | |
| --- | --- | --- |
| | t = 0 | t = 48 h at 100° C. |
| Control | 20 | 30 |
| 1 | 20 | 60 |
| 2 | 30 | 40 |
| 3 | 20 | 20 |

Although the above examples are directed to only a few of the very many variables which can be used in preparing the room temperature vulcanizable compositions of the present invention, it should be understood that the present invention is directed to a much broader variety of RTV's and method for making as shown in the description preceding these examples.

What we claim as new and desire to secure by Letters Patent of the United States is:

1. Room temperature vulcanizable compositions comprising by weight,
   (A) 100 parts of organopolysiloxane consisting essentially of chemically combined diorganosiloxy and terminated with polyalkoxy siloxy units,
   (B) 0 to 10 parts of a polyalkoxy silane of the formula

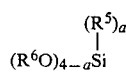

(C) 0 to 5 parts of amine accelerator,
   (D) an effective amount of a tin condensation catalyst of the formula

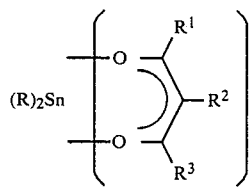

(E) 0 to 5 parts of a β-diketone of the formula

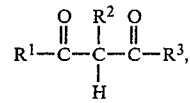

(F) 0 to 700 parts of filler,
   where R is selected from $C_{(1-18)}$ monovalent hydrocarbon radicals and substituted monovalent hydrocarbon radicals, and $R^1$, $R^2$ and $R^3$ are the same or different monovalent radials selected from the class consisting of hydrogen, R, —Si(R)$_3$, acyl and nitrile $R^5$ is a monovalent radical selected from $C_{(1-13)}$ hydrocarbon radicals and substituted $C_{(1-13)}$ hydrocarbon radicals, $R^6$ is a $C_{(1-8)}$ aliphatic organic radical selected from alkyl radicals, alkylether radicals, alkyl ester radicals, alkylketone radicals and alkylcyano or a $C_{(7-13)}$ aralkyl radical and a is a whole number equal to 0 or 1.

2. A room temperature vulcanizable composition in accordance with claim 1, where the tin catalyst is di(n-butyl)tinbis(acetylacetonate).

3. A composition in accordance with claim 1, whwere the alkoxy silane is methyltrimethoxysilane.

4. A composition in accordance with claim 1, where the organopolysiloxane is a polydimethylsiloxane.

5. A composition in accordance with claim 1, where the amine accelerator is diisobutylamine.

6. A composition in accordance with claim 1, where the β-diketone is acetylacetone.

7. Room temperature vulcanizable compositions comprising by weight,
   (A) 100 parts of silanol terminated polydiorganosiloxane,
   (B) 0.1 to 10 parts of a polyalkoxy silane,
   (C) 0 to 5 parts of amine accelerator,
   (D) an effective amount of a tin condensation catalyst of the formula

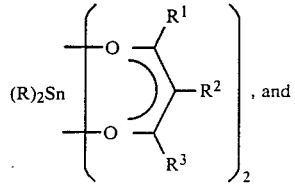, and (E) 0 to 5 parts of a β-diketone of the formula,,

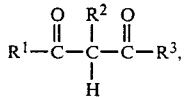

where R is selected from $C_{(1-18)}$ monovalent hydrocarbon radicals and substituted monovalent hydrocarbon radicals, and $R^1$, $R^2$ and $R^3$ are the same or different monovalent radicals selected from the class consisting of hydrogen, R, Si(R)$_3$, acyl and nitrile.

8. A room temperature vulcanizable composition in accordance with claim 7, where the tin catalyst is di(n-butyl)tinbis(acetylacetonate).

9. A composition in accordance with claim 7, where the alkoxy silane is methyltrimethoxysilane.

10. A composition in accordance with claim 7, where the silanol terminated polydiorganosiloxane is a silanol terminated polydimethylsiloxane.

11. A composition in accordance with claim 6, where the amine accelerator is diisobutylamine.

12. A composition in accordance with claim 7 where β-diketone is acetylacetone.

13. A method for making room temperature vulcanizable organopolysiloxane compositions which comprises mixing together under substantially anhydrous conditions a mixture comprising by weight,
(i) 100 parts of alkoxy terminated organopolysiloxane,
(ii) 0 to 10 parts of polyalkoxy silane, of the formula

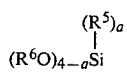

(iii) 0 to 5 parts of amine accelerator,
(iv) an effective amount of tin condensation catalyst of the formula

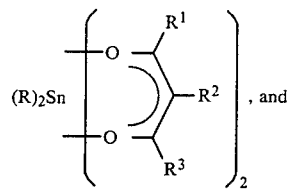

(v) 0 to 5 parts of a β-diketone of the formula

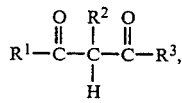

(vi) 0 to 700 parts of filler,
where R is selected from $C_{(1-18)}$ monovalent hydrocarbon radicals and substituted monovalent hydrocarbon radicals, and $R^1$, $R^2$ and $R^3$ are the same or different monovalent radicals selected from the class consisting of hydrogen, R, $Si(R)_3$, acyl and nitrile.

14. A method for making a room temperature vulcanizable organopolysiloxane composition which comprises,
(1) mixing together under substantially anhydrous conditions a mixture comprising by weight,
(i) 100 parts of silanol terminated polydiorganosiloxane,
(ii) 0.1 to 10 parts of polyalkoxy silane,
(iii) 0 to 5 parts of amine accelerator, and
(iv) 0 to 700 parts of filler,
(v) 0 to 5 parts, per 100 parts of the alkoxy terminated polydiorganosiloxane, of a β-diketone of the formula

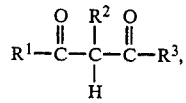

(2) allowing the mixture of (1) to equilibrate to produce polyalkoxy terminated polydiorganosiloxane, and
(3) further agitating the mixture of (2) under substantially anhydrous conditions and thereafter adding an effective amount of a tin condensation catalyst of the formula,

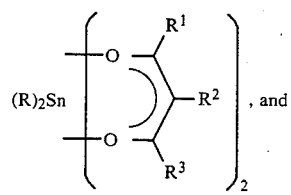

where R is selected from $C_{(1-18)}$ monovalent hydrocarbon radicals and substituted monovalent hydrocarbon radicals, and $R^1$, $R^2$ and $R^3$ are the same or different monovalent radicals selected from the class consisting of hydrogen, R, $Si(R)_3$, acyl and nitrile.

15. An RTV composition made in accordance with the method of claim 13 which is reinforced with a silica filler.

16. An RTV composition made in accordance with the method of claim 14 which is reinforced with a silica filler.

17. A method in accordance with claim 13, where the tin condensation catalyst is di(n-butyl)tin-bis(acetylacetonate).

18. A method in accordance with claim 13, where the alkoxy silane is methyltrimethoxysilane.

19. A method in accordance with claim 13, where the organopolysiloxane is a polydimethylsiloxane.

20. A method in accordance with claim 13, where the amine accelerator is diisobutylamine.

21. A method in accordance with claim 13, where the β-diketone is acetylacetone.

* * * * *